United States Patent
Huang et al.

(10) Patent No.: US 8,468,595 B1
(45) Date of Patent: Jun. 18, 2013

(54) CONTENT FILTERING PRIOR TO DATA ENCRYPTION

(75) Inventors: Fei Huang, Fremont, CA (US); Shu Huang, San Jose, CA (US); Liwei Ren, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 971 days.

(21) Appl. No.: 11/688,633

(22) Filed: Mar. 20, 2007

Related U.S. Application Data

(60) Provisional application No. 60/785,296, filed on Mar. 22, 2006.

(51) Int. Cl.
*H04L 29/06* (2006.01)
(52) U.S. Cl.
USPC ........ 726/22; 726/1; 726/11; 726/13; 726/26; 726/30
(58) Field of Classification Search
USPC .......................................... 726/30
See application file for complete search history.

(56) References Cited

U.S. PATENT DOCUMENTS

| | | | | |
|---|---|---|---|---|
| 6,148,336 | A * | 11/2000 | Thomas et al. | 709/224 |
| 2003/0023712 | A1 * | 1/2003 | Zhao et al. | 709/223 |
| 2003/0048286 | A1 * | 3/2003 | Lal | 345/700 |
| 2003/0081748 | A1 * | 5/2003 | Lipinski | 379/201.02 |
| 2003/0101235 | A1 * | 5/2003 | Zhang | 709/218 |
| 2004/0078334 | A1 * | 4/2004 | Malcolm et al. | 705/50 |
| 2006/0143688 | A1 * | 6/2006 | Futoransky et al. | 726/1 |
| 2006/0143700 | A1 * | 6/2006 | Herrmann | 726/14 |
| 2011/0063648 | A1 * | 3/2011 | Moore | 358/1.13 |

* cited by examiner

*Primary Examiner* — Brandon Hoffman
*Assistant Examiner* — Thomas C Lauzon
(74) *Attorney, Agent, or Firm* — Okamoto & Benedicto LLP

(57) ABSTRACT

A system (and a method) evaluates raw data from an application prior to modification of the raw data. The system inserts injection code into an application. The injection code is configured to hook an application. The application is configured to allow modification of the raw data. Modification includes encryption and/or compression. The system analyzes the raw data in a context of a predefined policy in response to the executing application reaching the injected code during execution. The system instructs the application to cease operating on the raw data in response to the predefined policy prohibiting further processing of the raw data or instructs the application to bypass the injection code in response to the predefined policy no prohibiting processing of the raw data.

20 Claims, 3 Drawing Sheets

US 8,468,595 B1

CONTENT FILTERING PRIOR TO DATA ENCRYPTION

CROSS REFERENCE TO RELATED APPLICATIONS

This application claims a benefit of U.S. Patent Application Ser. No. 60/785,296, entitled "Content Filtering Prior to Data Encryption", filed Mar. 22, 2006, the contents of which is hereby incorporated by reference.

This application is related to U.S. Provisional Patent Application Ser. No. 60/679,458, entitled "Architecture of Cascading Security Solution," filed on May 9, 2005, and U.S. patent application Ser. No. 11/413,754, entitled "Cascading Security Architecture", filed Apr. 27, 2006, the contents of which are hereby incorporated by reference.

BACKGROUND

1. Field of Art

The disclosure relates generally to the field of data security technologies, and more specifically, to information leak prevention technologies.

2. Description of the Related Art

Conventional information leak prevention technologies, including conventional filters such the anti-virus, firewall, anti-spam filters, increasingly are being designed to conduct real-time content analysis on network traffic and endpoint data access in order to solve increasing security problems present in networked environments. However, these conventional filters are not structured to conduct real-time content analysis on encrypted or compressed data traffic.

By encrypting or compressing data traffic, for example with passwords, before passing through conventional security filters, malicious software or virus exploit information security holes to bypass the content checking. Thus, conventional filtering technologies are insufficient to protect sensitive information or detect the intrusion and extrusion due to a lack of processes to check encrypted data traffic, costs associated with implementing algorithm "brute force" for decryption, and an addressing an unwieldy number of false positives raised when performing only a behavior based analysis.

SUMMARY

The disclosure generally relates to data security technologies, and more particularly, to information leak prevention technologies. Information leak prevention technologies protect against document leakage from end-points within and from an enterprise network. Further, information leak technologies can extend to other network security areas, for example, network intrusion detection.

In one embodiment, a system (and method) is configured to perform a deep content analysis on encrypted data by capturing the raw data before encryption. By way of example, consider HTTPS (hypertext transfer protocol, secure or HTTP/SSL) network traffic in which raw HTTP data is encrypted using a supporting SSL (secured socket layer) library. The encrypted data passes down to an under layer TCP/IP (transmission control protocol/internet protocol) socket and sent out onto a network. Leveraging a code injection mechanism, for example, an API (application programming interface) hooking technique, in one embodiment the system enters (or breaks) into the supporting encryption library. This allows an external content analysis process to hold execution of a monitored process at some point within the code execution while the injected (or inserted) code executes at this hooked entry point. The external content analysis process then extracts the raw data from the monitored process to verify (or analyze the raw data) before determining whether to allow it to continue processing for encryption.

The system captures the raw application data as it existed prior to encryption. The system holds the original execution thread while doing deep content analysis on the raw data. Using predefined (or pre-configured) security policies, the system determines whether to block activity involving the data or allowing the activity (and data) to continue processing.

The system (and method) is beneficially is applicable to processing and real-time analysis of many different types/forms of encrypted user data, for example, SSL, PGP (pretty good privacy), ZIP (zone information protocol) files and the like. In addition, the system advantageously can be used in any content related detection and protection configurations.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

Figure 1:
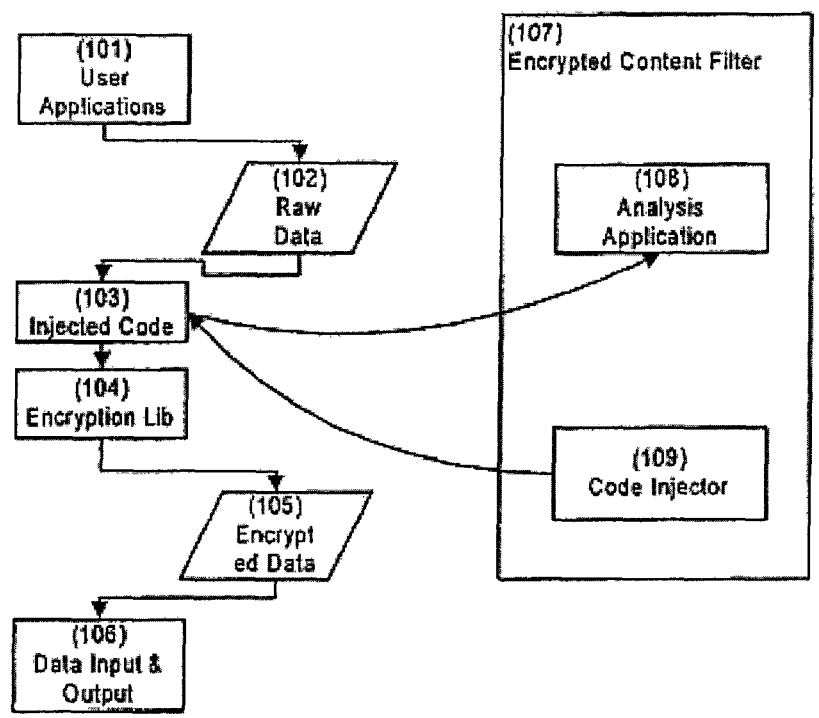
FIG. 1 illustrates one embodiment of an architecture for encrypted content filtering.

The Figures (FIGS.) and the following description relate to preferred embodiments herein by way of illustration only. It should be noted that from the following discussion, alternative embodiments of the structures and methods disclosed herein will be readily recognized as viable alternatives that may be employed without departing from the principles disclosed herein.

Reference will now be made in detail to several embodiments, examples of which are illustrated in the accompanying figures. It is noted that wherever practicable similar or like reference numbers may be used in the figures and may indicate similar or like functionality. The figures depict various embodiments for purposes of illustration only. One skilled in the art will readily recognize from the following description that alternative embodiments of the structures and methods illustrated herein may be employed without departing from the principles described herein.

Architectural Overview

For an architectural overview, reference is made by way of example to an embodiment for managing a lifecycle for documents with respect to endpoints (e.g., desktop computer, laptop, mobile phone, personal digital assistant, storage device, or other outlet for data) in a document management system. In such an example configuration, a system determines whether a document contains sensitive information, and protects the document from unauthorized accessed based on the determination. Although described by way of example, it is noted that the principles described herein may apply to other security applications and architectures.

In one embodiment, a document management system is configured (or adapted) to detect and track sensitive documents in the endpoints of the system. Each endpoint of a network has filters identifying documents being processed by the endpoint. A behavior analysis engine detects the process activities applied to the documents and identifies a behavior(s) based on the detected process activities. A local matching service determines whether the documents contain sensitive information by applying one or more multiple matching techniques.

Alternatively, the behavior analysis engine detects documents that are related to the identified documents, and the local matching service determines whether the identified documents contain sensitive information by determining whether the related documents contain sensitive information. If a document is determined to contain sensitive information, the system creates a record for the document and adds the record to a black list. A local policy engine determines whether to allow or to block the current process activities based on the behaviors, the content of the documents, and applicable security policies.

In another embodiment, a document management system is configured to detect sensitive documents being exported out of the endpoints of the system. For a given document, the system analyzes the document by checking whether a record of the document is in a black list. If no such record is present in the list, the system determines whether the document contains sensitive information by applying one or more multiple matching techniques. If the document is determined to contain sensitive information, the system creates a record for the document and adds the record to a black list, and a local policy engine determines whether to allow, to block, or to encrypt the document before being exported out of the endpoint.

Additional architectural details for the example are described in U.S. patent application Ser. No. 11/413,754, entitled "Cascading Security Architecture", filed Apr. 27, 2006, the contents of which are hereby incorporated by reference. It is noted that for ease of discussion, reference will be made to a cascading security architecture, for example, as described in U.S. patent application Ser. No. 11/413,754, and in particular, to a behavior analysis engine, a local policy engine, and a local match service.

In general a behavior analysis engine is configured to analyze the behaviors of all active applications in an endpoint. It can identify documents relevant to the document in motion identified by an agent. The behavior analysis engine also can be configured to keep track and analyze certain user process activities captured by the agents, such as print/print-screen, copy/cut and paste, send via email, upload through network, save/save-as, and the like. It can identify user behaviors such as intentional scrambling of sensitive documents based on the current user process activity, the analysis, and a collection of activity-to-behavior patterns. In one embodiment, the behavior analysis engine includes a code injector that injects code as described herein.

Further, in general, the local policy engine is configured to contain security policies. The security policies define a set of restrictions on document access and control (e.g., limiting access or modification rights of certain sensitive documents to certain categories of users), device input/output (I/O) (e.g., prohibiting exportation of sensitive documents without encryption), and certain user behaviors (e.g., prohibiting duplicating the content of sensitive documents). In one embodiment, the security policies are defined and maintained in a central policy service in a server and are synchronized with the local policy engine when an endpoint boots up (or is otherwise initialized). The local policy engine can also be configured to determine how a document is analyzed to detect sensitive information. In one embodiment, the local policy engine, along with a local match service, are configured to provide an analysis application as further described herein. The local match service determines whether a given document contains sensitive information which may be defined by keywords or patterns or document classification.

Turning now to FIG. 1, it illustrates one embodiment of an architecture (and technique or process) for encrypted content filtering. The architecture takes into account one or more user applications 101, raw data 102, injected code 103, an encryption library 104, encrypted data 105, and data input and output. The injected code 103 is from an encrypted content filter 107, which includes one or more analysis applications 108 (or analysis application engine) and a code injector 109.

Referring particularly to each component within the architecture, in one embodiment, the one or more user applications 101 include, for example, any software applications or processes that access encrypted data or files on a computer readable media. Examples of a user application 101 include encryption software, an archival tool (such as WinZip), a web browser, an electronic mail (email) reader, text or an image editor, communication utilities such as an FTP client, a peer-to-peer (P2P) application, an instant messenger application, a voice or video application such as an Internet protocol (IP) phone, and the like. It is noted that the one or more applications may be referenced as a target, which when executed may be referenced as a target process.

The raw data 102 in one embodiment includes unencrypted data used by the one or more user applications 101. Based on the particular user application 101, the raw data 102 includes, for example, the original data content, the email text, the message body, the voice or video stream data, and the like. In addition, the raw data 102 may include inbound or outbound non-encrypted data flow for user application 101. Accessing the raw data prior to encryption beneficially provides for analysis prior to encryption, and thus, provides greater control over security. Processes for extraction of the raw data may vary based on different applications have different ways for managing their raw data. For example, an instant message (IM) client application can be configured to open a file itself, read out the file content (point A), encrypt the file content, and send it out to another peer. The injected code in accordance with the embodiments disclosed herein copies out the raw data during this process, e.g., at point A, for analysis as disclosed herein.

The injected code 103 in one embodiment includes computer instructions (or program code) that is inserted (or injected) into the target (or application) 101 to execute (or run) in a context of the target (application) process. The injected code is configured to extract (or capture) the raw data, create (or generate) a communication pipe, and send the captured raw data to the analysis application 108. The injected code also is configured to hold target process and wait for verification results from the analysis application 108. Once the results are received, the injected code performs the returned action from the analysis application 108 (e.g., resume processing or fail out).

By way of example, the injected code 103 initially may be injected by the code injector 109 using a hooking injection technique, for example, API hooking. In this context of hooking, the code injector 109 inserts (or hooks) the appropriate code as described herein for analyzing the raw data prior to the application continuing on its execution path (e.g., before the data is encrypted). In particular, the injected code 103 executes in response to calling the hooked API or execution address entry. In one embodiment, a hooking point, can be structured inside an encryption library (but prior to application of any encryption codes). In another embodiment, a hooking point is outside of the encryption library (before calling the API or entry).

Further, it is noted that different applications may have different hooking points. Factors for evaluating hooking points include determining which hooking technique is used and the execution path to cover. For example, to cover HTTPS traffic, the system may be configured to hook two or three APIs in the SSL library, or hook twenty or thirty APIs in different applications. It is noted that based on the implementation of a particular hooking technique, the system can be configured to hook at the most efficient place to access the raw content before encryption happens.

The executing injector code 103 also creates a communication pipe between itself and the analysis application 108 of the encrypted content filter 107 to transfer the captured raw data 102. The injector code 103 also receives the analysis results and action commands from the analysis application 108. In response to action commands, it can decide to fail the current API or bypass the current API.

Action commands include commands such as block the processing or pass the processing down in the flow of the executing application. In addition, action commands can be decided based on the predefined security policy, for example, where there is identified sensitive data traffic or the like. Where the predefined security policy identifies sensitive data traffic, further processing may be blocked within the application. Alternatively, the process could continue but the event and the data are logged into the system. The blocked processing may include halting further execution or the application or re-routing the application to another point within the application that would not result in breach of the policy (e.g., divert processing to a next logical processing point or ending point within the application without the violating steps being executed). If the security policy is found not to be violated, further processing may be continued within the application without blockage or diversion. Thus, action commands can be used to block or allow the encrypted data 105 sent out from the endpoint.

The encrypted content filter 107 provides a filtering mechanism through the one or more analysis application engines 108 and the code injector 109. In one embodiment, the code injector 109 is configured to inject the hooking codes into a target (application 101) in memory in real-time or before the target API is initialized. The injected hooking codes can be configured to process in either a user mode or a kernel mode.

In one embodiment, the use of a particular mode may depend on the particular hooking mechanism. For example, the code injector could be a kernel mode device driver (windows) or user mode application which can access other process's memory space. The kernel mode driver (or injector) typically has higher priority than user applications. Thus, a kernel mode configuration allows for access of process memory and modification of execution codes real time (e.g., immediately or "on the fly") in memory. It addition, this mode can be configured to monitor all the user mode application's loading into memory. This means that the kernel mode configuration is configured to inject (or hook) the target process in time to copy the injected code to the target process memory before the target process encryption is executed.

The user mode application (or injector) may be configured to inject code by the help of documented or undocumented APIs. For example, the user mode injector can modify the target process memory and copy the injected codes into that memory space. Additional types of hooking codes that may be injected include, for example, device driver code injection, Microsoft Detour hooking library, Microsoft WriteProcessMemory( . . . ) APIs, third party code injection or application programming interface (API) hooking libraries or modules and the like.

In one embodiment, the analysis application 108 comprises any executable process or application that communicates with the injected code 103 through per-process communication methods. By way of example, the analysis application 108 creates a listening communication pipe to talk with the injected codes. In one embodiment, listening and talking includes communicating with the injected code through the established communication pipe once the injected code is executed. In particular, the injected code connects to the "listening socket/pipe" in the analysis application 108, and once connected, passes over the captured raw data through this pipe so that it can be analyzed.

Once the analysis application 108 receives any pieces of raw data 102 reported, it can reassemble the raw data 102 and perform a deep content analysis on the raw data 102. The analysis application 108 may send an action command back to control the execution of target process. In view of one or more predefined security policies, the analysis application 108 can make a final decision to block or allow this transaction then notify the related injected codes 103 to perform the action commands (e.g., block, log, or allow the target process execution).

In one embodiment, an encrypted content filtering technique uses the code injector 109, the injected code pieces 103, and the analysis application 108. By way of example in a Microsoft® Windows™ operating system platform, the code injector 109 may be configured as a kernel mode device driver that performs continuous monitoring of loaded and executing applications 101. The code injector 109 injects the hooking codes as soon as the target library or executable files are loaded or launched (executed). The analysis application 108 may be configured as a user mode Windows™ service to communicate with injected code to get the raw data and send back the control commands to the injected code based on the analysis results and the security policy.

The control commands correspond to pre-determined (or pre-configured) policies as to how the application should continue processing based on characteristics of the deep analysis of the raw data. For example, if the analysis identifies certain keywords or grouping of keywords identified as highly sensitive the predefined policy may cause the analysis application 108 to return an instruction (command) to terminate or fail the executing application (target) 101. If the analysis determines that there are no issues relative to the predefined policies, the analysis application 108 would return a bypass instruction, i.e., continue with the processing path. Alternatively, the system can be structured to create and execute predefined policies, for example, striping out some of the raw data (e.g., sensitive words) and allow the processing to continue without the stripped out data.

When continuing with the processing path, the data is ready for encryption using the encryption library 104. In one embodiment, the encryption library 104 includes any data encryption library or modules used by the one or more user applications 101. The encryption library 204 uses the raw data 102 as input and produces the encrypted data 105 to lower layer software for further processing. Examples of the encryption library 104 include SSL libraries, data compression libraries (e.g., ZIP or RAR), PGP encryption libraries and the like.

The encrypted data 105 in one embodiment includes the output of the encrypted library 104. For example, it is the encoded data related to the raw data 102. The data input and output 106 in one embodiment includes the under layer of encryption library 104. Once it captures the encrypted data 105, it stores, saves or exports the data.

Example Embodiment for Encrypted Content Filtering

Figure 2:
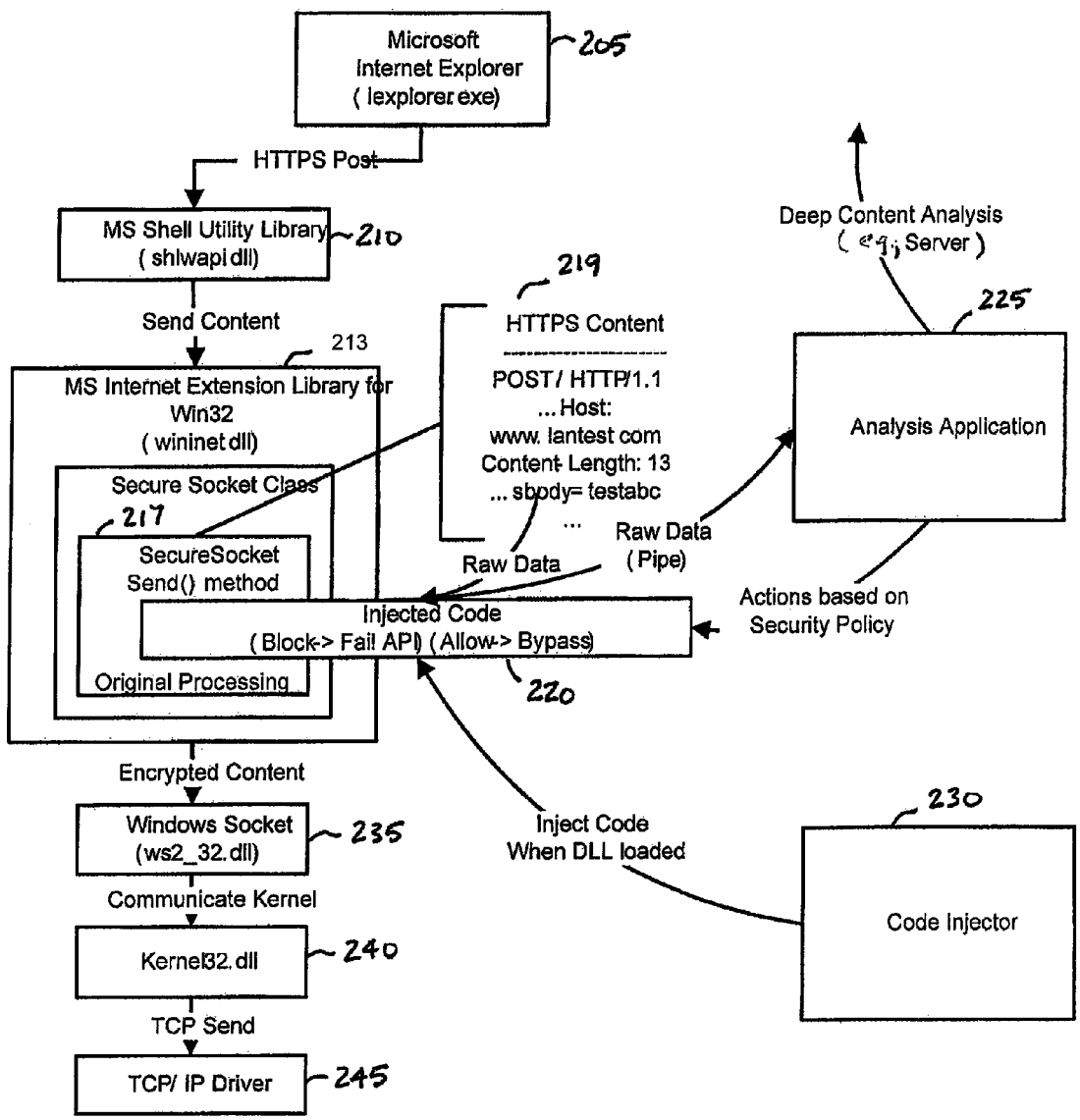
FIG. 2 illustrates one embodiment of a method of encrypted content filtering using, for example, secured hypertext transfer protocol (HTTPS).

FIG. 2 illustrates one embodiment of a method of encrypted content filtering using, for example, secured hypertext transfer protocol (HTTPS) working in a Microsoft® Internet Explorer™ (IE) application. Generally in this example, a dynamic link library within the operating system (wininet dll) encrypts the HTTPS packet by calling the standard operating system encryption library (crypt32.dll). The injected code is inserted at the entry of the operating system secure socket layer. Thereafter, when there is a sending request, the injected code receives a clean-text HTML packet for parsing and analysis by, for example, the analysis application 108. Based on predetermined policies (e.g., configured and stored in a database or a configuration file), the analysis application 108 either rejects or approves the outgoing data traffic before the original encryption processing.

Reviewing the process in more detail, it starts with an analysis application 225 running as a system service within the operating system, e.g., Windows™. An application program, for example, the Internet Explorer™ (IE) browser program, 205 is launched. At initialization, supporting dynamic link libraries, e.g., shlwapi.dll 210, wininet.dll 213 and other libraries 235, 240, 245, start to load. A code injector 230 is notified about loading libraries 235, 240, 245. The code injector 230 inserts injected (or hooking) code 220 in with at least one of the loading libraries, e.g., Wininet.dll 213, at the hooking point. In the Windows operating system, the hooking point may be SecureSocket::Send( ) 217.

When an HTTPS post (or instruction) is issued from IE 205, the raw HTTPS content 219 is hooked by the injected code 220 as it is passed down to SecureSocket::Send( ) 217. The injected code 220 is executed before original SecureSocket::Send( ) 217 is executed. The injected code 220 obtains the raw HTTPS content 219, creates (or generates) a communication pipe (raw data pipe) to the analysis application 225, and copies the raw HTTPS content 219 to the analysis application 225 through this established pipe. Thereafter, it waits for the result.

The analysis application 225 receives the data 219, parses it and analyzes a sensitive level for it based on a predefined security policy. The analysis application 225 then makes a decision to "block" or "log" or "allow" (action command) the execution of the program. The analysis application 225 transmits the appropriate action command back to the waiting injected code 220. If the action command is "allow", the injected code 220 then resumes the execution to the original execution path, i.e., from 217 to 235 to 240 to 245, etc. Alternatively, if the action command is "block", the injected code 220 breaks out the original execution path. In such instances the data sending of the IE application IE 205 would, for example, fail or terminate.

Figure 3:
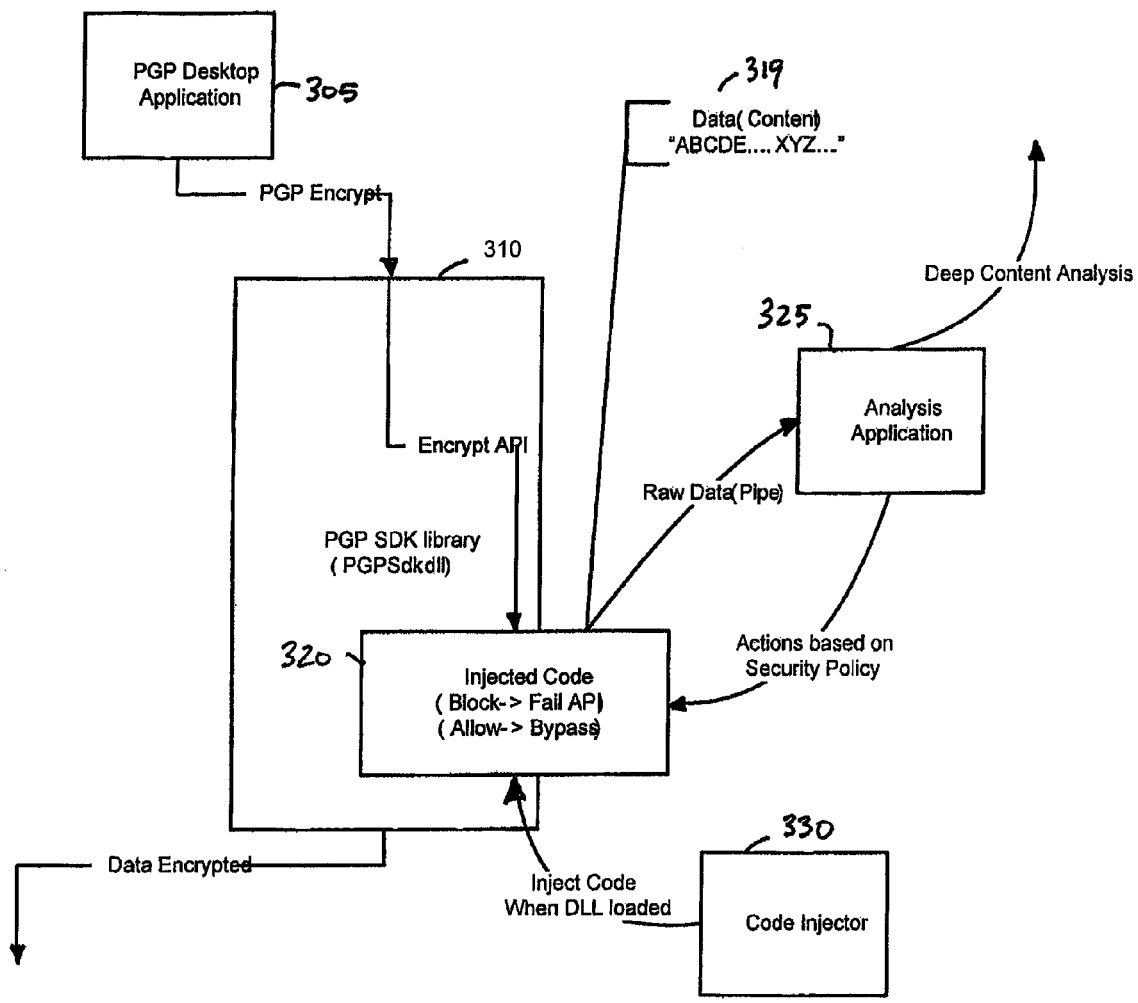
FIG. 3 illustrates an example embodiment for encrypted content filtering in a pretty-good-privacy (PGP) context.

By way of another example, the process (and system) described herein may be applied in other security contexts. For example, FIG. 3 illustrates an example embodiment for encrypted content filtering in a pretty-good-privacy (PGP) context. Generally in this example, a PGP desktop program 305 executes (or performs) a PGP encryption. Supporting libraries, e.g., PGP SK library (e.g., pgpsdk.dll) 310 begins to load along with an encryption API. A code injector 330 (e.g., functionally similar to the code injector 230 previously described) is notified about loading library. The code injector 330 inserts injected (or hooking) code 320 in with at least one of the loading libraries, e.g., pgpsdk.dll, at the hooking point.

When data or content (e.g., document, image file, text message, e-mail message, audio file or video file) is set for encryption, the raw data (or content) 319 is hooked by the injected code 320 from the code injector 330. The injected code is executed before original encryption code is executed. The injected code 320 obtains the raw data 319, creates (or generates) a communication pipe (raw data pipe) to the analysis application 325, and copies the raw data 319 to the analysis application 325 through this established pipe. Thereafter, it waits for the result from the analysis application 325 and deep content analysis.

The analysis application 325 receives the data 319, parses it and analyzes a sensitive level for it based on a predefined security policy. The analysis application 325 then makes a decision to "block" or "log" or "allow" (action command) the execution of the program. In part, this may include a deep content analysis in which the particular data itself is analyzed on the context of the predefined security policy (e.g., manual analysis or automated analysis such as through, for example, knowledge engines/bases). The analysis application 325 transmits the appropriate action command back to the waiting injected code 320. If the action command is "allow", the injected code 320 then resumes execution through the original execution path. Alternatively, if the action command is "log", the injected code 320 first records the event and data, then resumes execution through the original execution path. Another alternative is if the action command is "block", the injected code 320 breaks out the original execution path. In such instances the encryption action on the data 319 will halt (stop) or fail. In some embodiments, a message regarding this result will be transmitted to the user (e.g., displayed on a screen).

It is noted that although the example provided is in the context of a Microsoft Windows operating system, the principles and techniques disclosed herein are applicable to other operating systems, for example, a Linux operating system, a Macintosh System X operating system, a Sun Solaris operating system and the like. In addition, generally the disclosed embodiments describe filtering encrypted content based on predetermined policies, which beneficially helps manage secured document movement within and across a network. The disclosed embodiments beneficially extracts raw data and allow for hooking into an encryption library for analyzing raw data prior to allowing that data to be encrypted.

Further, the features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments of the processes, including the examples with HTTPS and PGP in FIGS. 2 and 3, may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Similarly, various embodiments of the processes, including the examples with HTTPS and PGP in FIGS. 2 and 3, may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software elements may be written or coded using a programming language. Examples of programming languages may include C, C++, BASIC, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Moreover, the software elements are structured as instructions executable by a processor (e.g., an Intel Centrino, an AMD Athlon, or Sun SPARC processor). The instructions may be stored on a computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the disclosed embodiments. This was done merely for convenience and to give a general sense of the embodiments herein. This description should be read to include one or at least one and the singular also includes the plural unless it is obvious that it is meant otherwise.

Upon reading this disclosure, those of skill in the art will appreciate still additional alternative structural and functional designs for a system and a process for content filtering prior to data encryption through the disclosed principles herein. Thus, while particular embodiments and applications have been illustrated and described, it is to be understood that the disclosure is not limited to the precise construction and components disclosed herein and that various modifications, changes and variations which will be apparent to those skilled in the art may be made in the arrangement, operation and details of the method and apparatus disclosed embodiments without departing from the spirit and scope of the disclosure herein.

What is claimed is:

1. A computer-implemented method performed at an endpoint computer of a document management system for evaluating raw data prior to modification of the raw data, the method comprising:
   receiving a predefined security policy by a local policy engine at the endpoint computer from a central policy service at a server;
   inserting injection code a hooking point in a dynamic link library by a code injector executing on the endpoint computer into an application executing on the endpoint;
   executing the injection code by the endpoint computer in response to the application execution at an execution address entry;
   receiving raw content set for encryption;
   creating a communication pipe from the injection code to an analysis application executing on the endpoint computer in a context of the application execution;
   copying the raw content to the analysis application by way of the communication pipe;
   if the raw content comprises a document, then checking whether a record of the document is in a black list;
   if the record does not exist, then determining whether the document contains sensitive information by applying a matching technique, and if the document is determined to contain sensitive information, then creating a record for the document and adding the record to the black list; and
   if the record exists, then using the predefined security policy to determine an appropriate action command before the document is exported out of the endpoint computer.

2. The method of claim 1, wherein the analyzing performed by the analysis application includes analyzing a sensitive level for the raw content based on the predefined security policy.

3. The method of claim 2, wherein the predefined security policy comprises blocking further processing of the raw content if the raw content has a security of a predetermined level.

4. The method of claim 1, wherein the appropriate action command is selected from the defined group of action commands consisting of block, log and allow.

5. The method of claim 4, wherein the injection code resumes execution of an original execution path if the appropriate action command is allow, wherein the original execution path includes encrypting the raw content, and breaks out of the original execution path if the appropriate action command is block.

6. The method of claim 1, wherein the injection code is inserted within a library which is loaded by the application.

7. The method of claim 1 further comprising:
   tracking user process activities; and
   analyzing the user process activities to identify document scrambling.

8. The method of claim 7, wherein the user process activities comprise print, print-screen, copy, cut-and-paste, send via email, upload through a network, save, and save-as.

9. A computer readable medium storing instructions executable by a processor at an endpoint computer to evaluate raw data prior to modification of the raw data, the instructions when executed by the processor cause the processor to:
   receive a predefined security policy from a central policy service at a server;
   insert injection code at a hooking point in a dynamic link library;
   execute the injection code in response to execution of an application at an execution address entry;
   receive raw content set for encryption;
   capture the raw content in a context of the application execution;
   copy the raw content to an analysis application; and
   if the raw content comprises a document, then checking whether a record of the document is in a black list;
   if the record does not exist, then determining whether the document contains sensitive information by applying a technique, and if the document is determined to contain sensitive information, then creating a record for the document and adding the record to the black list; and
   if the record exists, then using the predefined security policy to determine an appropriate action command before the document is exported out of the endpoint computer.

10. The computer readable medium of claim 9, wherein the action command is a command from the set of commands consisting of block, log and allow.

11. The computer readable medium of claim 10, further comprising resuming execution of an original execution path if the action command is allow, wherein the original execution path includes encrypting the raw content, and breaking out of the original execution path if the action command is block.

12. The computer readable medium of claim 9, wherein the injection code is inserted within a library which is loaded by the application.

13. The computer readable medium of claim 9, wherein the instructions when executed by the processor further cause the processor to analyze the user process activities that are tracked to identify document scrambling.

14. The computer readable medium of claim 13, wherein the user process activities comprise print, print-screen, copy, cut-and-paste, send via email, upload through a network, save, and save-as.

15. A system to evaluate raw data prior to modification of the raw data, the system comprising:
   a central policy service at a server configured to serve security policies;
   a local policy engine at an endpoint computer configured to receive the security policies from the central policy service;
   a code injector at the endpoint computer configured to inject code at a hooking point in a pretty good privacy (PGP) dynamic link library;
   a processor at the endpoint computer configured to execute the injected code in response to reaching the hooking point;
   a data store at the endpoint computer configured to receive the raw data captured in response to the execution of the injected code; and
   an analysis application engine at the endpoint computer configured to provide an action command determined based on an analysis of the raw data in relation to the security policies from the central policy service, wherein the analysis involves, if the raw content comprises a document, checking whether a record of the document is in a black list, and if the record does not exist, then determining whether the document contains sensitive information by applying a matching technique, and if the document is determined to contain sensitive information, then creating a record for the document and adding the record to the black list, and if the record exists, then using the security policies to determine the action command before the document is exported out of the endpoint computer.

16. The system of claim 15, wherein the action command is a command from a group of commands consisting of block, log and allow.

17. The system of claim 16, further comprising resuming execution of an original execution path if the action command is allow, wherein the original execution path includes encrypting the raw content, and breaking out of the original execution path if the action command is block.

18. The system of claim 15, wherein the injected code is inserted within a library which is loaded by the application.

19. The system of claim 15, wherein the analysis further involves analyzing user process activities that are tracked to identify document scrambling.

20. The system of claim 19, wherein the user process activities comprise print, print-screen, copy, cut-and-paste, send via email, upload through a network, save, and save-as.

\* \* \* \* \*